Patented Mar. 31, 1942

2,278,345

UNITED STATES PATENT OFFICE 2,278,345

METHOD OF APPLYING POLYVINYL CHLORIDE TO METAL SURFACES

Donald G. Benson, Cuyahoga Falls, Ohio, assignor to The B. F. Goodrich Company, New York, N. Y., a corporation of New York No Drawing. Application October 12, 1939, Serial No. 299,142

1 Claim. (Cl. 154—2)

This invention relates to composite articles in which polyvinyl halides are adhered to surfaces requiring protective coatings.

It is known that polyvinyl halides form excellent protective coatings because of their great resistance to oxygen, water, acids, alkalies, organic solvents, oils, and other deteriorating influences. It has been very difficult, however, to obtain satisfactory adhesion between polyvinyl halides and metals, glass, wood, and other surfaces requiring protection. It has been proposed to employ an interlayer of fabric to obtain adhesion, but it has previously been the practice to adhere the previously coated fabric to the metal.

I have discovered that excellent protective coatings are formed if fabric is adhered to a base by means of an alkali metal silicate, and the polyvinyl halide is then deposited on the fabric from solution.

The fabric may be made of cotton, silk, asbestos, artificial silk, etc., the particular fabric selected depending on the base to be protected and the particular use to which the composite article is to be put. Since the adhesion between the fabric and the alkali metal silicate and polyvinyl halide is mechanical, the use of fabrics with a rough surface such as cotton duck and square-woven asbestos fabrics is preferred.

The polyvinyl halide may be alpha, beta, or delta polyvinyl chloride, polyvinyl bromide, or even a copolymer of vinyl chloride with a minor proportion of a vinyl organic ester such as vinyl acetate, although the gamma polymer of vinyl chloride is preferred because of its inertness. If desired, the polyvinyl halide may be plasticized to form compositions such as those described in U. S. Patent No. 1,929,453 issued to Waldo L. Semon.

In practicing the method of this invention, the fabric is first adhered to the base by means of the alkali metal silicate, water glass being the preferred material. This adhesion may be accomplished by coating the base with water glass, pressing the fabric onto the coated surface, and allowing the assemblage to dry.

The fabric is then coated with a solution of the polyvinyl halide. Gamma polyvinyl chloride, for instance, may be dissolved at an elevated temperature in mesityl oxide, chlortoluene, alkyl ketones containing between 4 and 7 carbon atoms, or a mixture of solvents and applied to the fabric by brushing, spraying, or any other desired method. The number of coats employed depends upon the nature of the conditions to which the protective coating is to be subjected. In lining metal tanks designed to hold acid, for instance, as many as twenty or more coats of the gamma polyvinyl chloride solution are sometimes employed to insure the production of an impermeable layer which will indefinitely resist the action of the contents of the tank.

It is to be understood that many modifications and variations are within the spirit and scope of the invention as defined in the appended claim.

I claim:

The method of providing metal tanks with a protective polyvinyl chloride surface which comprises adhering a woven fibrous fabric with a rough surface to the metal with water glass, drying, and then depositing from solution upon the fabric a plurality of layers of polyvinyl chloride.

DONALD G. BENSON.